United States Patent [19]

Baker

[11] 4,245,510
[45] Jan. 20, 1981

[54] PORTABLE ACCELEROMETER

[75] Inventor: Henry O. Baker, Ottawa, Canada

[73] Assignee: Her Majesty the Queen in right of Canada, as represented by the Minister of National Defence, Canada

[21] Appl. No.: 28,991

[22] Filed: Apr. 11, 1979

[30] Foreign Application Priority Data

Jul. 6, 1978 [CA] Canada .................................. 306930

[51] Int. Cl.³ ............................................. G01P 15/08
[52] U.S. Cl. .................................. 73/517 R; 73/382 R
[58] Field of Search ........... 73/516 R, 516 LM, 517 R, 73/517 B, 179, 503, 490, 382 R; 367/130

[56] References Cited

U.S. PATENT DOCUMENTS

| | | | |
|---|---|---|---|
| 3,455,148 | 7/1969 | Foster et al. | 73/517 R X |
| 4,079,804 | 3/1978 | Paillard | 73/517 R X |
| 4,091,356 | 5/1978 | Histchins | 73/517 R X |

*Primary Examiner*—James J. Gill
*Attorney, Agent, or Firm*—Larson, Taylor and Hinds

[57] ABSTRACT

A portable accelerometer unit is described for measuring deviations or excursions from a datum due to an applied load or force. The portable accelerometer unit includes an accelerometer device mounted by suspension means in a housing, and is operable to generate an output signal in response to the applied load. An electrical circuit is also provided connectible to the accelerometer device to receive the output signal therefrom. This circuit includes at least one operational amplifier stage containing an operational amplifier. This amplifier has two input terminals and an output terminal. One of the input terminals is connected through a first variable resistance to a power supply. The other input terminal is connected to the accelerometer to receive the output signal therefrom. This other input terminal also has a feedback circuit operatively connected to it. The feedback circuit is controlled by a second variable resistance, whereby to effect zeroing of an accelerometer signal due to gravity. An output device in the form of a meter, strip chart recorder or the like is driven from the output terminal to provide a readout of the applied load. A more preferred form of accelerometer unit includes a second operational amplifier stage to provide for isolation of the output device from the accelerometer device. In a still more preferred form, the portable accelerometer unit includes a third operational amplifier stage. The third operational amplifier has a feedback circuit connected between an input terminal and its output terminal, controlled by a variable resistance. This provides sensitivity control of the output signal.

6 Claims, 3 Drawing Figures

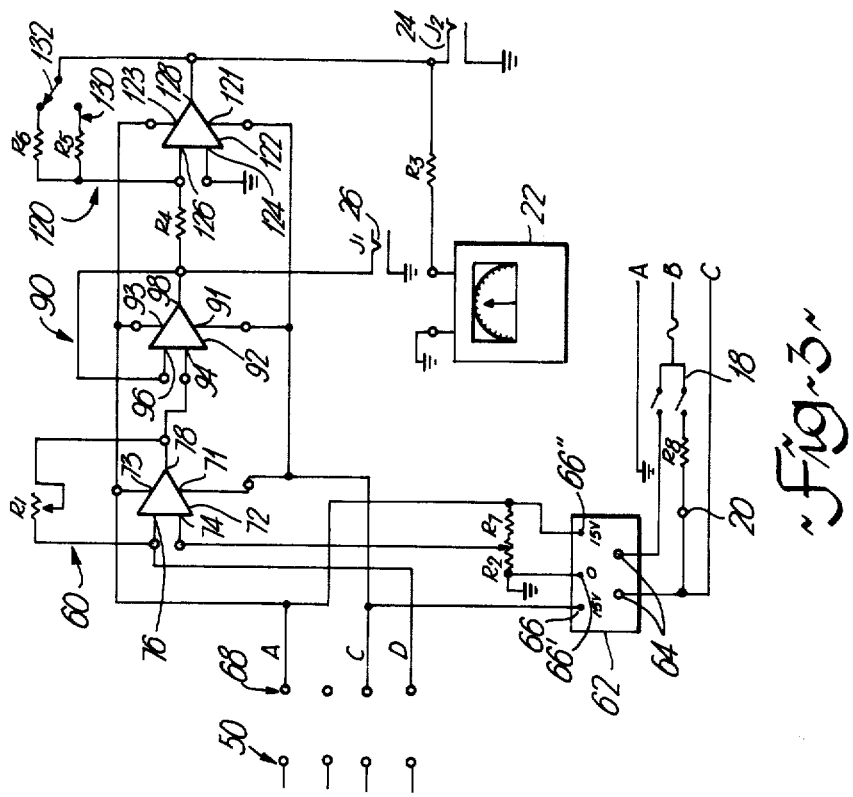
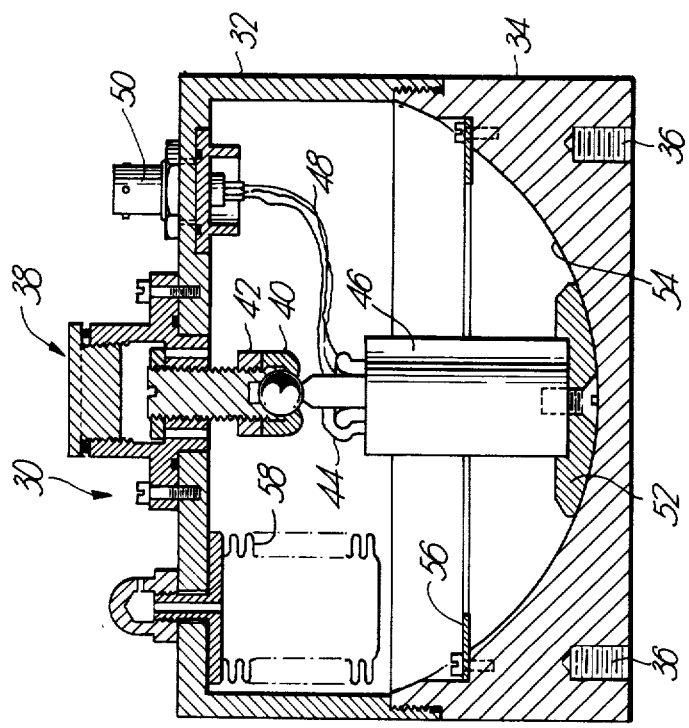

PORTABLE ACCELEROMETER

This invention relates to an accelerometer unit, especially an accelerometer unit that is portable and adapted for use on a vessel, vehicle, another form of transportation device, or the like.

BACKGROUND OF THE INVENTION

There are many instances when it is highly desirable to be able to measure accurately the magnitude of a load applied to a vehicle, a ship, a floating buoy, or some other transportation device. This is especially so if measurements are being taken, or something is being towed. For example, in the process of mineral exploration, magnetometers or other similar devices are frequently dragged in the air behind an aircraft, or in the sea behind a ship. The body being towed normally comprises a complex package of electronic instrumentation. Thus, it would be highly desirable to know accurately the kinds of vertical loads applied to the towed body, the towing cable, or any couplings connecting that cable either to the towed body or the "towing vehicle". When aerial surveys are conducted, for example, in hilly terrain or where the topography of the land includes many lakes, rivers or valleys, air turbulence is frequently encountered. The same sort of buffeting will apply, of course, to the vertical motion caused by waves on a lake or ocean.

The measurement of vertical acceleration loads is frequently made in the "towing vehicle". This, one must take into account pitching and rolling motions of that vehicle. In other words, it is an accurate measurement of the vertical component of the applied load which is most frequently of concern. That vertical component must therefore be isolated or separated from non-vertical components of the load or force applied to the "towing vehicle". One technique for eliminating the non-vertical components of a load applied to the towing vehicle is the use of stabilized platforms. Such platforms, however, are relatively bulky, are costly, and have an operating life span of perhaps three hundred hours mean time between breakdowns. Moreover, using a stabilized platform requires a much higher level of maintance skill, with its attendant higher costs. Further yet, the provision of spare units for backup purposes would also be costly.

BRIEF SUMMARY OF THE INVENTION

The present invention will overcome many of the problems associated with the use of stabilized platform assemblies for measuring vertical loads applied to towed bodies and/or the towing cable with its associated couplings. The present invention provides a portable accelerometer unit which is simple to operate and service. The present invention provides a portable accelerometer unit which is relatively inexpensive, and will be substantially unaffected by normal non-vertical loads applied to the towing vehicle, be it an aircraft or a ship.

Other features and advantages of the present invention will become apparent from the detailed description below. Accordingly, there is provided by this invention a portable accelerometer unit for measuring excursions from a datum due to an applied load, comprising in combination an accelerometer device mounted by suspension in a housing, and operable to generate an output signal in response to displacement from the datum due to the applied load; an electrical circuit connectible to the accelerometer device to receive the output signal therefrom, the circuit including at least one operational amplifier stage containing an operational amplifier, the operational amplifier having input terminals and an output terminal; one of the input terminals being connected through a first variable resistance to a power supply, with one other input terminal being connected to the accelerometer to receive the output signal therefrom, the other input terminal having a feedback circuit operatively associated with it, the feedback circuit being controlled by a second variable resistance, whereby to effect zeroing of an accelerometer output signal due to gravity; and an output device connected to the output terminal to provide a readout of the applied load.

In a more preferred form, the portable accelerometer unit herein includes a second and a third operational amplifier stage with second and third operational amplifiers. A feedback circuit is connected between the output and an input terminal of the third operational amplifier, such feedback circuit including at least two resistance elements and switch means, operable to provide switchable sensitivity control of the output signal from the third operational amplifier.

BRIEF DESCRIPTION OF THE DRAWINGS

The detailed description below will more clearly be understood when read in conjunction with the accompanying illustrative drawings, wherein

FIG. 2 is an elevation view taken in cross-section to illustrate some details of the pendulous accelerometer assembly used herein; and FIG. 3 is a circuit drawing of the electrical circuit included in the present portable accelerometer unit.

DETAILED DESCRIPTION OF THE PREFERRED EMBODIMENTS

Figure 1:
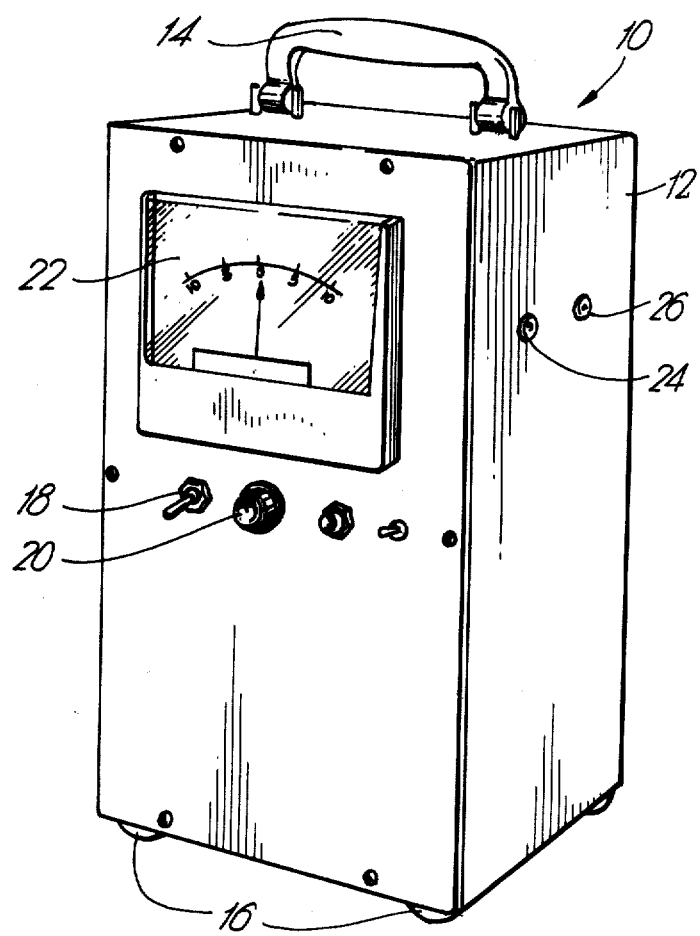
FIG. 1 is a perspective view illustrating one form of the portable accelerometer unit described herein.

FIG. 1 shows the present portable accelerometer unit overall at 10. This unit 10 includes a casing 12 to which a carrying handle 14 and feet 16 are attached. Suitable openings are provided in the faces of the casing 12 to accommodate, for example, a main on-off switch 18, a reset button 20, a readout device in the form of a meter 22 and the like. Jacks 24 and 26 are also provided to connect the accelerometer unit 10 to another, more remotely located metering device, and pen recording device, respectively. Additional reference will be made to these items and their inter-relationship when discussing the electrical circuit of FIG. 3.

Turning now to FIG. 2, a pendulous accelerometer assembly housing is shown overall at 30. An earlier description of such an accelerometer housing appears in the Proceedings of the Syposium on "Ocean Wave Measurement and Analysis" (American Society of Civil Engineering) September, 1974, in a paper by Mr. Ernest H. Bowler. This housing 30 includes threadably interconnected upper and lower sections 32 and 34. The lower housing section 34 includes threaded bore holes 36 for securing the accelerometer assembly housing 30 to the base of the accelerometer unit casing 12.

The upper section 32 of the accelerometer housing 30 is provided with an accelerometer suspension mounting assembly 38 which includes a ball retainer 40 and ball retainer lock nut 42. An accelerometer suspension 44 is connected to the ball retainer 40 and serves to support an accelerometer device 46 in suspension. This accelerometer 46 is conventional, being a "Kistler 305 Model" accelerometer. Such an accelerometer is well known in the art, and a detailed description thereof is not necessary for an understanding of this invention.

The accelerometer 46 generates an electrical output signal in response to a vertical load applied to it. That output signal is conducted by electrical wires 48 to a multi-pronged connector 50. (Bendix No. Pt07E-8-P(SR)

The accelerometer 46 is provided with a damping weight 52 whose outer surface is hemispherical in form, and closely conforms to a correspondingly hemispherically formed surface 54 on the interior of the lower section 34 of the accelerometer housing 30. The extremities of the surface 54 are delimited by a limit ring 56 which restricts deviation of the accelerometer 46° to 30° from the vertical. The accelerometer 46 is oil damped, with the interior of the housing 30 being filled with a silicone oil. Expansion of that oil due to temperature fluctuations is accommodated by a bellows assembly 58. Thus, the limit ring 56 prevents damage to the accelerometer suspension shaft. The silicon oil, on the other hand, dampens the pendulum response to horizontal accelerations of short duration. These might arise during the rolling or yawing movement of a ship, aircraft or other towing vehicle.

Turning now to FIG. 3, the electrical circuitry of this invention is illustrated as containing a first, a second and a third amplification stage identified respectively as 60, 90 and 120. The electrical circuitry including the accelerometer 46 are conveniently energized by a power supply capable of supplying plus and minus 15 volts DC at 90 milliamperes with 0.2% regulation. One such commercially available power supply is known as a "VEECO LAMDA Model LZD-22" which operates from a standard 115 volt 60 cps supply. This power supply unit is illustrated in FIG. 3 at 62 and includes input terminals 64 and output terminals 66, 66' and 66''.

Output terminal 66 is connected to one of the connection points 68 that comprises a mating connector for the multi-pronged connector 50. The outlet terminal 66 is biased at −15 volts, and also connects to terminals 71, 91 and 121 of first, second and third operational amplifiers 72, 92 and 122.

The output terminal 66' has 0 bias on it, being connected to ground on one hand, and through a variable resistance ground potentiometer indicated at R2, to a positive input terminal 74 of the operational amplifier 72. The ground potentiometer R2 is also connected through a further resistance R7 to the circuit connecting output terminal 66'' to terminals 73, 93 and 123 of the operational amplifiers 72, 92 and 122. This same branch line also connects to another of the input terminals 68 which receive an output signal from the accelerometer 46.

Yet another of the signal input terminals 68 is connected to a negative input terminal 76 of the first operational amplifier 72. To complete the circuitry, an output terminal 78 of the first operational amplifier 72 supplies a signal to a positive input terminal 94 of the second operational amplifier 92. A negative input terminal of the amplifier 92 is shown at 96, and is short circuited to an output terminal 98 of that same amplifier. Thus, operational amplifier 92 is connected as a voltage follower, and serves to isolate the output of the first operational amplifer stage from the output circuit or devices.

An output terminal 98 of the second operational amplifier 92 drives the output device mentioned earlier at 26, as well as driving a negative input terminal 126 of the operational amplifier 122 through a resistor R4. A positive input terminal of operational amplifier 122 is illustrated at 124, and is connected to ground. An output terminal 128 of the operational amplifier 122 drives the output device 22, mentioned earlier, through an output resistance R3, as well as driving an optional, remote output device from jack 24. The negative input terminal 126 and output terminal 128 of the operational amplifier 122 are interconnected by a feedback circuit 130. This feedback circuit comprises two parallel arms with resistors R5 and R6, and switch means 132. The value of resistances R5 and R6 are so chosen as to provide for the operational amplifier 122 two levels of gain, times one and times two.

Operation of the portable accelerometer unit 10 will now be described in greater detail.

When the accelerometer 46 is connected to an appropriate power supply and placed in a vertical position at the earth's surface, a force of one "g" (gravity) is exerted on the seismic mass of the accelerometer. Thus, a current of 240 micro-amperes will flow through the range resistor therein. This current, when the accelerometer 46 is used in the current mode, (or the voltage developed across the resistor, when the accelerometer is used in the voltage mode), will act as an offset signal of one "g" in magnitude to any indicating device connected to the accelerometer. If accelerations towards or away from the earth's centre, that is, accelerations in the vertical axis, are to be measured, then the one "g" offset must be cancelled.

In the portable accelerometer unit 10, the servo accelerometer 46 and the operational amplifiers (op-amps) 72, 92, 122 are energized by the power supply 62 capable of supplying plus and minus 15 VDC at 90milliamperes with 2% regulation. With the portable accelerometer unit 10 sitting "upright" i.e., at an angle less than 30= from the vertical, the pendulum and thus the accelerometer 46 will assume a vertical position. Switching on the power supply 62 will energize the accelerometer 46 and associated amplifier circuits. The ground connection of the accelerometer is connected to the negative signal input of op-amp 72. As the accelerometer seismic mass is in a field of one "g", current will flow through the range resistor, creating a signal voltage between the negative signal input 76 and ground. The signal is amplified by op-amp 72 and returned through feedback resistor R1 as negative feedback. The feedback current will be, for all practical purposes, equal and opposite to that supplied by the accelerometer 46 and the negative signal input point of op-amp 72 will be virtually at ground potential. The output signal point 78 of op-amp 72 will be at a potential determined by the current flowing through R1 times the resistance in ohms of R1. As the accelerometer 46 has a sensitivity of 240 micro-amperes per "g", 240 micro-amperes will be flowing through the range resistor and through R1 the feedback resistor. If the positive signal input 74 of op-amp 72 is set to ground potential (ground resistor R2 set anti-clockwise) then R1 can be adjusted so that its value (4167 ohms) times the current through it will cause the output of op-amp 72 to equal minus one volt. This will represent a value of one "g". By applying a signal of appropriate amplitude to the positive signal input 74 of op-amp 72, this standing voltage can be cancelled. This is done through resistor R1.

The output of op-amp 72 is fed to the positive signal input point 94 of op-amp 92. This amplifier 92 is connected as a voltage follower, isolating the output of op-amp 72 from the output circuits, i.e., output devices. The output of op-amp 92 is used to drive the output pen recorder 26 (or a tape recorder or meter) and the negative input 126 of op-amp 122 through resistor R4.

Op-amp 122 has two purposes. It isolates the local meter 22 and the remote meter 24, if fitted, from the pen recorder output 26, thus lessening any chances of one indicating device interferring with another. It also has two levels of gain, times one and times two, controlled by resistors R5 and R6, and switch S1, i.e., feedback circuit 130. When the input to the accelerometer 46 is large, i.e. high sea states, switch means 132 is switched to place R5, a 5K ohm resistor, in the circuit 130. As R4 and R5 are equal in value, the gain of the stage is unity. With a signal output of one volt, a current of one milliampere will flow through R3 and the local meter 22. As the local meter 22 is a centre zero one milliampere meter, an output of one volt will drive the meter full scale in the direction representing the polarity of the output voltage. Thus, with R1 adjusted so that the output of op-amp 72 is one volt when the accelerometer 46 is being accelerated by a force of one gravity, the output meter 22 will read full scale. The signal polarity has been arranged so that if the meter reads in a clockwise direction, the acceleration is upwards. If the acceleration forces being experienced are small, the sensitivity of the unit can be doubled by switching S1 to connect to R5, and FS=½ g (full scale reading of the meter equals ½ "g"). This allows small acceleration levels, i.e., 0.1 g to be more discernible on the meter(s).

The electrical components described herein are commercially available. Thus, the following table will identify those elements illustrated in FIG. 3.

| S1 | Switch, Range | |
|---|---|---|
| F1 | Fuse 1/5 Amp | |
| P5 | Power Supply | Model LZD-22 |
| OA3 | Amplifier | ME 174 |
| OA2 | Amplifier | ME 174 |
| OA1 | Amplifier | ME 174 |
| R8 | Resistor, 100KΩ | |
| R7 | Resistor, 300KΩ | |
| R6 | Resistor, 10KΩ | |
| R5 | Resistor, 5KΩ | |
| R4 | Resistor, 5KΩ | |
| R3 | Resistor, 1KΩ | |
| R2 | Resistor, 50KΩ | |
| R1 | Resistor, 10KΩ | |
| SYMBOL | NOMENCLATURE | SPEC. OR MAT'L |

The foregoing description relates to a particularly useful portable accelerometer unit. Certain modifications and changes will be apparent to those knowledgeable in this art, as may be indicated by local requirements. It is intended within the scope of this invention to encompass all such changes and modifications as fall within the scope of the claims below.

The embodiments of the invention in which an exclusive property or privilege is claimed are defined as follows:

1. A portable accelerometer unit for measuring excursions from a datum due to an applied load, comprising in combination;
    an accelerometer device mounted by suspension in a housing, and operable to generate an output signal in response to displacement from said datum due to the applied load;
    an electrical circuit connectible to said accelerometer device to receive the output signal therefrom, said circuit including at least one operational amplifier stage containing an operational amplifier, the operational amplifier having input terminals and an output terminal; one of said input terminals being connected through a first variable resistance to a power supply, with the other input terminal being connected to the accelerometer to receive the output signal therefrom, the other input terminal having a feedback circuit operatively associated with it, said feedback circuit being controlled by a second variable resistance, said variable resistances being adjustable to zero the accelerometer output due to gravity; and
    an output device connected to said output terminal to provide a readout of said applied load.

2. A portable accelerometer unit as defined in claim 1, wherein said electrical circuit includes a second operational amplifier stage containing a second operational amplifier, said output terminal of the first operational amplifier being connected to an input terminal of the second operational amplifier, and an output terminal of said second operational amplifier being connected to said output device.

3. A portable accelerometer unit as defined in claim 2, wherein the electrical circuit includes a third operational amplifier stage with a third operational amplifier; the third operational amplifier including an input terminal connected to receive an output signal from the output terminal of the second operational amplifier, and an output terminal connected to said output device.

4. A portable accelerometer unit as defined in claim 3, wherein the output terminal of the second operational amplifier provides a signal driving both a second output device and the third operational amplifier stage.

5. A portable accelerometer unit as defined in claim 3 or 4, wherein the third operational amplifier stage includes a feedback circuit controlled by a variable resistance providing sensitivity control of the output signal from said third operational amplifier stage.

6. A portable accelerometer unit as defined in claim 3 or 4, wherein a feedback circuit is provided, connected between the output and the input terminals of the third operational amplifier, said feedback circuit includes at least two resistance elements and switch means operable to provide switchable sensitivity control of the output signal from said third operational amplifier.

* * * * *